United States Patent [19]

Obata et al.

[11] Patent Number: 5,251,250
[45] Date of Patent: Oct. 5, 1993

[54] METHOD OF STORING CALLERS TELEPHONE NUMBERS IN DURING-ABSENCE AUTOMATIC TELEPHONE ANSWERING STATE

[75] Inventors: Kijuro Obata; Takeshi Shimizu, both of Iwaki, Japan

[73] Assignee: Alpine Electronics, Inc., Tokyo, Japan

[21] Appl. No.: 748,219

[22] Filed: Aug. 21, 1991

[30] Foreign Application Priority Data

Sep. 12, 1990 [JP] Japan .............................. 2-241817
Sep. 12, 1990 [JP] Japan .............................. 2-241818

[51] Int. Cl.$^5$ .................... H04M 11/00; H04B 1/00; G08B 5/22
[52] U.S. Cl. ........................ 379/59; 379/58; 455/54.1; 340/825.44
[58] Field of Search ................ 379/58, 59; 455/54.1; 340/825.44

[56] References Cited

U.S. PATENT DOCUMENTS

| | | | |
|---|---|---|---|
| 4,241,238 | 12/1980 | Strand | 179/5.5 |
| 4,852,146 | 7/1989 | Hathcock et al. | 379/58 |
| 5,043,721 | 8/1991 | May | 340/825.44 |
| 5,058,150 | 10/1991 | Kang | 379/58 |
| 5,093,659 | 3/1992 | Yamada | 340/825.44 |

FOREIGN PATENT DOCUMENTS 0077539  5/1985  Japan .............................. 379/58
0023266  1/1987  Japan .............................. 379/59

*Primary Examiner*—Curtis Kuntz
*Assistant Examiner*—Vijay Shankar
*Attorney, Agent, or Firm*—Guy W. Shoup; Norman R. Klivans

[57] ABSTRACT

A method of storing a callers telephone number transmitted from a caller in a during-absence automatic telephone answering state in a memory, and a vehicle telephone system. This method comprises a step of providing in the system a first memory having storage areas for storing telephone numbers and names of callers as data therein, and a second memory for storing therein as data telephone numbers transmitted from callers in a during-absence automatic telephone answering state; a step of checking whether the telephone number transmitted from one of the callers in the automatic telephone answering state coincides with one of the telephone numbers registered in the first memory; a step of reading one of the names stored in the first memory in response to the telephone number coincident with one telephone number referred to above if it is determined to be positive in the second step; and a step of storing the telephone number transmitted from the one caller and the name thus read in the second memory. In addition, this vehicle telephone system basically includes a first memory, a second memory, a telephone number determining device, and a caller's name storing device.

10 Claims, 8 Drawing Sheets

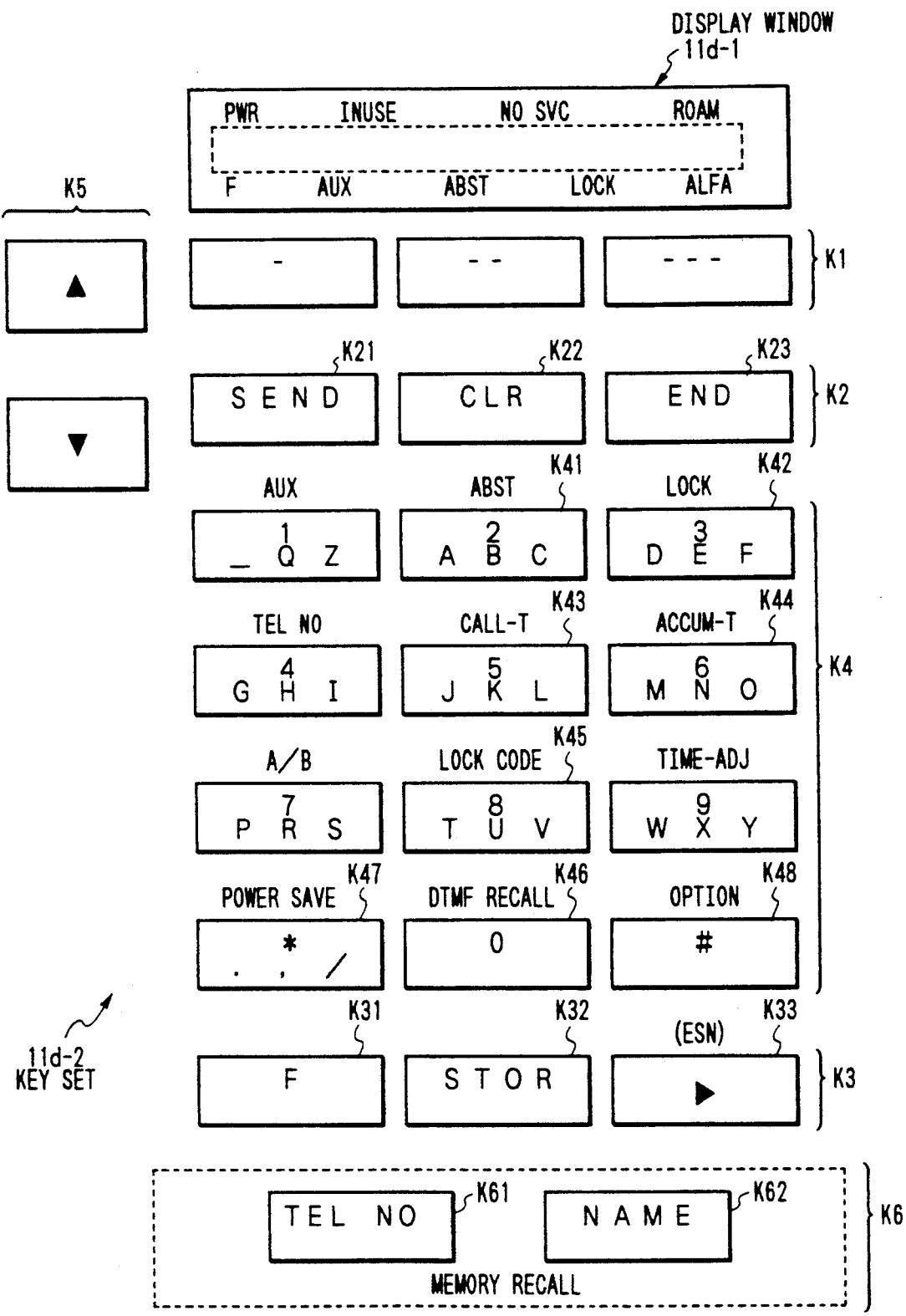

FIG. 3

FIRST MEMORY
                                                      11a-2

| MEMORY AREA | TELEPHONE NUMBER | NAME |
|---|---|---|
| 0 0 | 123-456-7890 | NISINA |
| 0 1 | 234-567-8901 | KURODA |
| 0 2 | 345-678-9012 | KAJIWA |
| 0 3 | | |
| 0 4 | | |
| ⋮ | | |
| 7 8 | 678-954-1234 | KAIFU |
| 7 9 | | |
| 8 0 | | |
| 8 1 | | |
| | ⋮ | |
| 9 9 | | |

Rows 00–79: FIRST MEMORY AREA
Rows 80–99: SECOND MEMORY AREA

FIG. 4

SECOND MEMORY 11a-3

| MEMORY AREA | NUMBER OF INCOMING CALLS | TELEPHONE NUMBER | NAME | TIME OF INCOMING CALL |
|---|---|---|---|---|
| 1 | 4 | 123-456-7890 | NISINA | 11:34 AM |
| 2 | 3 | 567-890-1234 | ---------- | 10:12 AM |
| 3 | 2 | 678-954-1234 | KAIFU | 9:59 AM |
| 4 | | 234-567-8901 | KURODA | (11th, NOVEMBER) 6:10 AM |
| 5 | | 853-334-5678 | ---------- | 11:04 PM |
| 6 | | 283-474-8991 | SAKAI | 8:07 PM |
| ⋮ | ⋮ | ⋮ | ⋮ | ⋮ |
| 19 | | 915-322-1285 | ---------- | 10:01 AM |
| 20 | | 345-678-9012 | KAJIWA | (10th, NOVEMBER) 8:20 AM |

METHOD OF STORING CALLERS TELEPHONE NUMBERS IN DURING-ABSENCE AUTOMATIC TELEPHONE ANSWERING STATE

BACKGROUND OF THE INVENTION

1. Field of the Invention

The present invention relates to a method of storing callers' telephone numbers transmitted by callers during an automatic telephone answering state in a memory, and particularly to a method of storing callers telephone numbers received in during an automatic telephone answering state in a memory in a vehicle telephone system activated to store only callers' telephone numbers received during an automatic telephone answering state in the memory when a vehicle owner is absent or to store the same together with callers' names therein.

2. Description of the Related Art

There is a growing demand for a mobile or vehicle telephone system from the standpoint of an increase in motorization, business, safety, etc. This type of vehicle telephone system is provided with convenient various functions such as a function (1) for storing a plurality of callers' telephone numbers and names in a memory so as to display respective ones of the telephone numbers and the names on a display window as needed, an abbreviating/calling function (2) for setting up, as an abbreviated telephone number, each of memory or storage areas in a memory for storing telephone numbers and names therein so as to make a call using the thus-shortened telephone number, and an automatic telephone answering function (3).

More specifically, callers' telephone numbers and callers' names are registered in advance on storage areas of 00 to 99 in a first memory (telephone number storage unit), and suitably displayed on a display window. Alternatively, storage areas of two figures or digits are associated with abbreviated numbers. When an abbreviated number (storage area) is inputted, data indicative of a telephone number corresponding to the inputted abbreviated number is read from the first memory so as to make a call. Otherwise, a caller's telephone number received at the time that a vehicle owner is absent is stored as data in a second memory (callers-telephone-number-in-subscriber's-absence storage unit), and displayed on the display window as necessary.

It is convenient if a caller's name as well as a caller's telephone number can be stored in the second memory for storing therein the caller's telephone number received when the vehicle owner is absent.

A caller can transmit his own telephone number with relatively ease. However, the caller must carry out cumbersome operations when it is desired to send even a caller's name, and hence requires much time to do so.

There has thus been a demand for methods capable of storing caller's names in memories together with callers telephone numbers with ease.

Therefore, the present invention provides a method of storing a caller's telephone number transmitted from a caller during automatic telephone answering state in a memory, the method being capable of automatically storing even a callers name in the memory if the caller simply transmits only his own telephone number to a receiver.

On the other hand, when it is desired to permit storage of a caller's name, the time of each incoming call, etc. as well as a caller's telephone number as data in the second memory for storing therein the callers telephone number received when the vehicle owner is absent, a considerable capacity is required for each telephone number, and only twenty telephone numbers or so can be stored at the utmost in terms of the manufacturing cost. Thus, if twenty telephone calls or more are made by callers during an automatic telephone answering state, then already-stored old telephone numbers are erased so as to store the latest twenty telephone numbers in the second memory.

Busy businessmen normally receive many telephone calls when they are leaving their cars. Therefore, they suitably make phone calls to the calling parties who made their calls in their absence as soon as they return to their cars, thereby to erase data indicative of the so-received telephone numbers from storage areas. However, they must leave their cars before they make telephone or reply calls to all the callers' telephone numbers. In this case, the number of accumulated incoming calls exceeds the storable capacity, and the old data stored in the memory are erased therefrom.

Therefore, a problem takes place in that a telephone call cannot be made to each of the calling parties whose telephone numbers erased from the memory.

SUMMARY OF THE INVENTION

With the foregoing problems in view, it is a principal object of the present invention to provide a method of storing a caller's telephone number as data in a memory wherein callers' telephone numbers received during an automatic telephone answering state can suitably be retained as data, and such callers' telephone number data can be stored as they are without erasing the same even when the number of accumulated incoming calls in the automatic telephone answering state exceeds a predetermined number depending on the capacity of the memory.

It is another object of the present invention to provide a method of storing a caller's telephone number transmitted by a caller during an automatic telephone answering state wherein callers' telephone numbers can selectively be retained on other storage areas.

According to one aspect of the present invention, there is provided a method of storing a caller's telephone number transmitted by a caller during an automatic telephone answering state in a memory, the method comprising the steps: a first step of disposing in a vehicle telephone system a first memory (telephone number storage unit) having storage areas for storing telephone numbers and names of called parties as data therein, and a second memory (callers-telephone-number-in-subscriber's-absence storage unit) for storing therein as data telephone numbers transmitted by callers an automatic telephone answering state; a second step of checking whether or not a telephone number transmitted by one of the callers in the automatic telephone answering state coincides with one of the telephone numbers registered in the first memory; a third step of reading one of the names stored in the first memory in response to the telephone number coinciding with the one telephone number referred to above if it is determined to be positive in the second step; and a fourth step of storing as data the telephone number transmitted by the one caller and the name thus read in the second memory.

Each of the telephone numbers and names is stored as data in the first memory. In addition, a check is made as to whether one of the callers' telephone numbers transmitted by the callers who make calls in the automatic telephone answering state coincides with one of the telephone numbers which have already been registered in the first memory. If it is determined to be positive, a desired name stored as data in the first memory is read from the first memory in response to the telephone number coinciding with the one telephone number referred to above. Then, the name thus read is stored as data in the second memory together with each telephone number transmitted by each caller. As a result, each caller's name is also automatically stored as data in the second memory if the caller simply transmits only his own telephone number.

According to another aspect of the present invention, there is provided a method of storing a caller's telephone number transmitted by a caller during an automatic telephone answering state in a memory, the method comprising the steps: a first step of providing in a vehicle telephone system a first memory having storage areas for storing telephone numbers and names as data therein, and a second memory for storing therein as data a plurality of the latest telephone numbers out of telephone numbers transmitted by callers who make calls during an automatic telephone answering state; sequentially displaying the callers' telephone numbers received in the automatic telephone answering state on a display window, the callers' telephone numbers having been stored in the second memory; retaining a displayed telephone number on an empty storage area in the first memory when a predetermined key is depressed; and retaining a displayed telephone number on an empty storage area out of predetermined storage areas in the first memory when one or more keys grouped in other combinations are depressed.

Each of the telephone numbers and names is stored as data in the first memory, and each of the callers' telephone numbers received in the automatic telephone answering state is stored as data in the second memory. When an ignition switch is turned on, the callers' telephone numbers received in the automatic telephone answering state, which have already been stored as data in the second memory, are sequentially displayed on a display window. When one or more keys grouped in predetermined combinations are depressed, the displayed telephone number is retained on the space storage area in the first memory. Alternatively, when one or more keys grouped in other combinations are depressed, the displayed telephone number is retained on the empty storage area out of the predetermined storage areas in the first memory.

As a consequence, the callers' telephone numbers received in the automatic telephone answering state can suitably be stored, and retained without erasing the same even when the number of accumulated incoming calls exceeds a predetermined number. In addition, important callers' telephone numbers can selectively be retained as data.

According to the present invention, as described above, the telephone numbers and the names are stored as data in the first memory. In addition, a check is made as to whether the telephone number sent by a caller coincides with one of the telephone numbers registered in the first memory. If it is determined to be positive, one of the names stored as data in the first memory is read therefrom in response to the telephone number referred to above, and each telephone number transmitted by the caller and each name of the caller are stored as data in the second memory. Thus, if the caller transmits only his own telephone number to the receiver, his name is also stored automatically as data in the second memory.

Further, according to the present invention, the telephone numbers and the names are stored as data in the first memory, and the callers' telephone numbers received in the automatic telephone answering state are stored as data in the second memory. Then, the callers' telephone numbers which have been stored as data in the second memory are successively displayed on the display window, and each of the displayed telephone numbers is retained on the space or empty storage area in the first memory when a predetermined key is depressed. Alternatively, when another key is depressed, each of the displayed telephone numbers is retained on the empty storage area out of the predetermined storage areas in the first memory. Therefore, each of the callers' telephone numbers received in the automatic telephone answering state can suitably be retained, and the retained telephone numbers are no longer erased even when the number of the accumulated incoming calls in the automatic telephone answering state exceeds a predetermined number. In addition, important callers' telephone numbers can selectively be retained.

The above and other objects, features and advantages of the present invention will become apparent from the following description and the appended claims, taken in conjunction with the accompanying drawings in which a preferred embodiment of the present invention is shown by way of illustrative example.

DESCRIPTION OF THE DRAWINGS

FIG. 2 is a diagram for describing a control/display unit of the system;

FIG. 3 is a diagram for describing one example in which telephone numbers are stored as data in a telephone number storage unit;

FIG. 4 is a diagram for describing one example in which callers telephone numbers are stored as data in a callers-telephone-number-in-subscriber's-absence storage unit;

DETAILED DESCRIPTION OF THE PREFERRED EMBODIMENTS

FIG. 1 is a block diagram showing a structure of one embodiment of a cellular type mobile telephone system based on a method of storing callers' telephone numbers as data in a memory according to the present invention. Referring to FIG. 1, the system comprises a control unit 11, a transceiver unit 12, and an antenna 13. The control unit 11 is mutually connected to the transceiver unit 12 by means of a plurality of power lines and power control lines PL, a plurality of digital data transmission/reception lines DL, a reception sound or telephone line SLR, a transmission sound or telephone line SLT, etc.

The cellular type mobile telephone system is activated in the following manner. More specifically, a telephone service area is subdivided into a large number of subareas as cells. A single radio telephone station (base station) is provided for each subarea, and a telephone call is sequentially switched from one transmitter station to the next station as a vehicle moves from cell to cell. When an incoming call is received by a mobile telephone system or a telephone call is sent therefrom, the transfer of predetermined data is carried out between one base station and the mobile telephone system. Thereafter, the reception telephone line and the transmission telephone line are electrically connected to each other to enable voice message traffic between the two points.

(a) Control Unit

The control unit 11 employed in the system will now be described below.

Figure 1A:
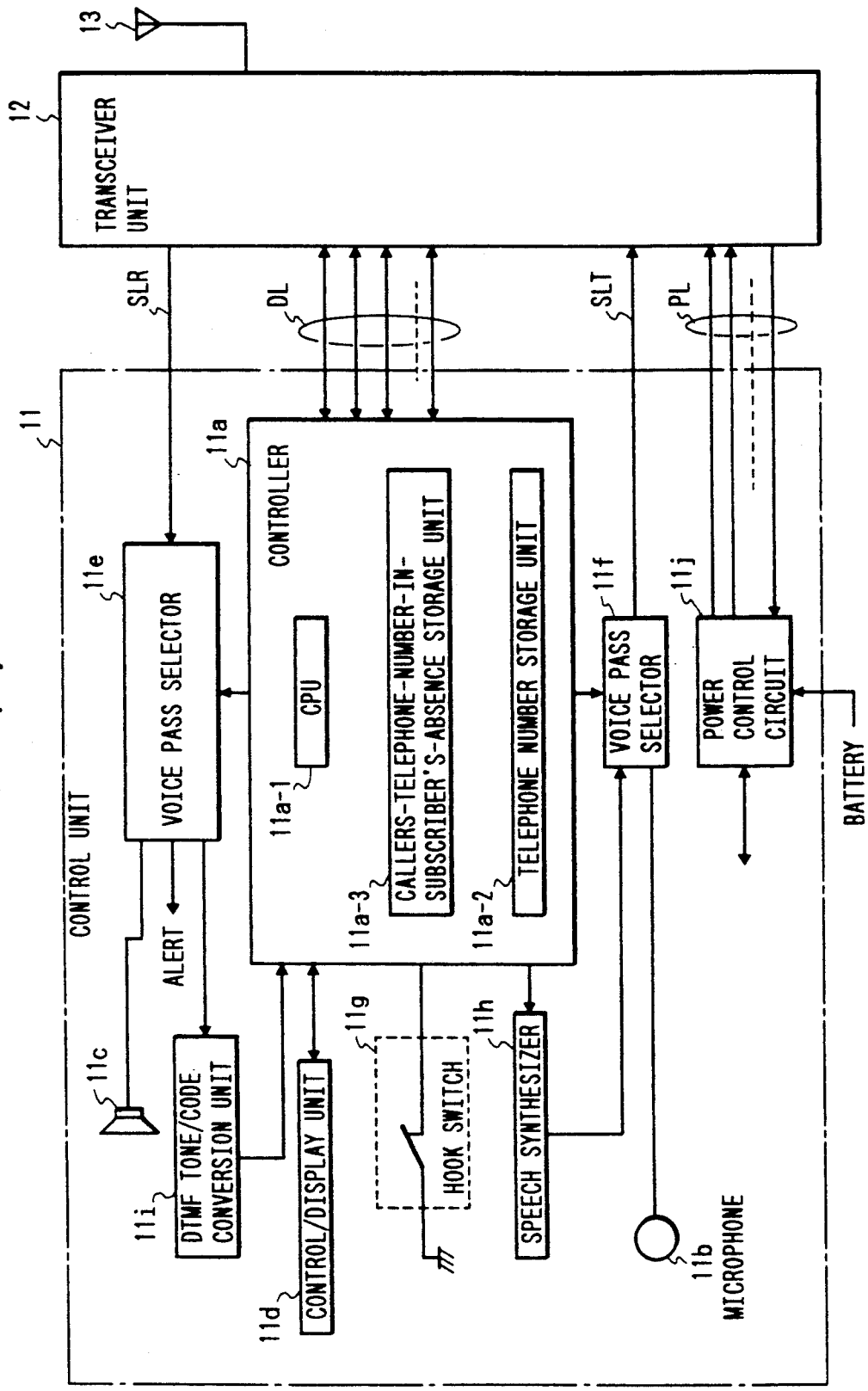
FIGS. 1(a) and 1(b) is a block diagram showing a structure of one embodiment of a cellular type mobile telephone system based on a method of storing callers' telephone numbers in a memory, according to the present invention.

As shown in detail in FIG. 1(a), the control unit 11 comprises a controller 11a electrically made up of a computer, a microphone 11b, a speaker 11c, a control/display unit 11d, voice pass selectors 11e, 11f, a hook switch 11g, a speech synthesizer 11h, a DTMF tone/code conversion unit 11i, and a power control circuit 11j. Although not mechanically shown in the drawing, the control unit 11 includes a handset and a base unit. The microphone 11b and the speaker 11c are mounted on the reverse sides of the handset, whereas the control/display unit 11d is provided on the surface of the handset as shown in FIG. 2.

Controller

The controller 11a will now be described below. The controller 11a has a central processing unit (CPU) 11a-1 for carrying out the control of storing therein incoming data indicative of a caller's telephone number received during an automatic telephone answering state and of retaining such data thereon, a telephone number storage unit (first memory) 11a-2 (see FIG. 3) having 100 storage areas corresponding to storage areas (corresponding to abbreviated numbers) of two figures or digits comprising 00 to 99, and used to store as data telephone numbers and names therein, and a callers-telephone-number-in-subscriber's-absence storage unit (second memory) 11a-3 (see FIG. 4) having 20 storage areas (which are represented by the telephone numbers, names, the time of each of incoming calls, and the number of the incoming calls, for example) at the maximum for storing therein data such as the latest telephone number out of callers' telephone numbers received during an automatic telephone answering state. Speech synthesizer and DTMF tone/code conversion unit:

When a caller's telephone call is made during an automatic telephone answering state, the speech synthesizer 11h is activated to inform the person who made the phone call, of a guide message with a DTMF function by means of speech synthesis, thereby sending a necessary telephone number to the caller. After the guide message is delivered to the caller, the DTMF tone/code conversion unit 11i is activated to receive a DTMF tone generated at the time that the caller inputs his own telephone number by his key operation so as to convert the same into the original telephone number or the like.

Arrangement of control/display unit

As shown in FIG. 2, the control/display unit 11d comprises a display window 11d-1, and a key set 11d-2. The display window 11d-1 displays various states such as "power on", "when in use", "unserved state", "a telephone answering set is in operation", "under lock", etc. on its peripheral area, and displays on its central area abbreviated numbers, names and telephone numbers.

The key set 11d-2 includes three one-touch type keys K1, various types of function keys K2, K3, an alphanumeric key K4, an alert key K5, a memory call key K6, etc.

Each time the alphanumeric key K4 is depressed, it is activated to sequentially display numeric and alphabetic characters applied to a key top on the display window 11d-1, thereby making it possible to input desired alphanumeric characters. When the alphanumeric key K4 is depressed simultaneously with an F key K31, it is activated to display on the display window an telephone answering state (K41), a locked state (K42), a call-time displayed state (K43), an accumulation-time displayed state (K44), a lock-code corrected state (K45), and a callers telephone number received at the time of the telephone answering state (K46), . . .

After a intended called telephone number is inputted, a SEND key (K21) out of the functions key K2 is depressed at the time of a telephone call, or the key (K21) is depressed so as to make a state being on the phone when an incoming call is received. A CLR key (K22) is depressed when improper data is inputted or the contents of the first and second memories are cleared. An END key (K23) is depressed when a telephone message is completed. In addition, a STOR key (K32) out of the key K3 is depressed when a telephone number or the like is stored as data in the first memory 11a-2 or a telephone number received in the automatic telephone answering state is written from the second memory 11a-3 to the first memory 11a-2.

Figure 1B:
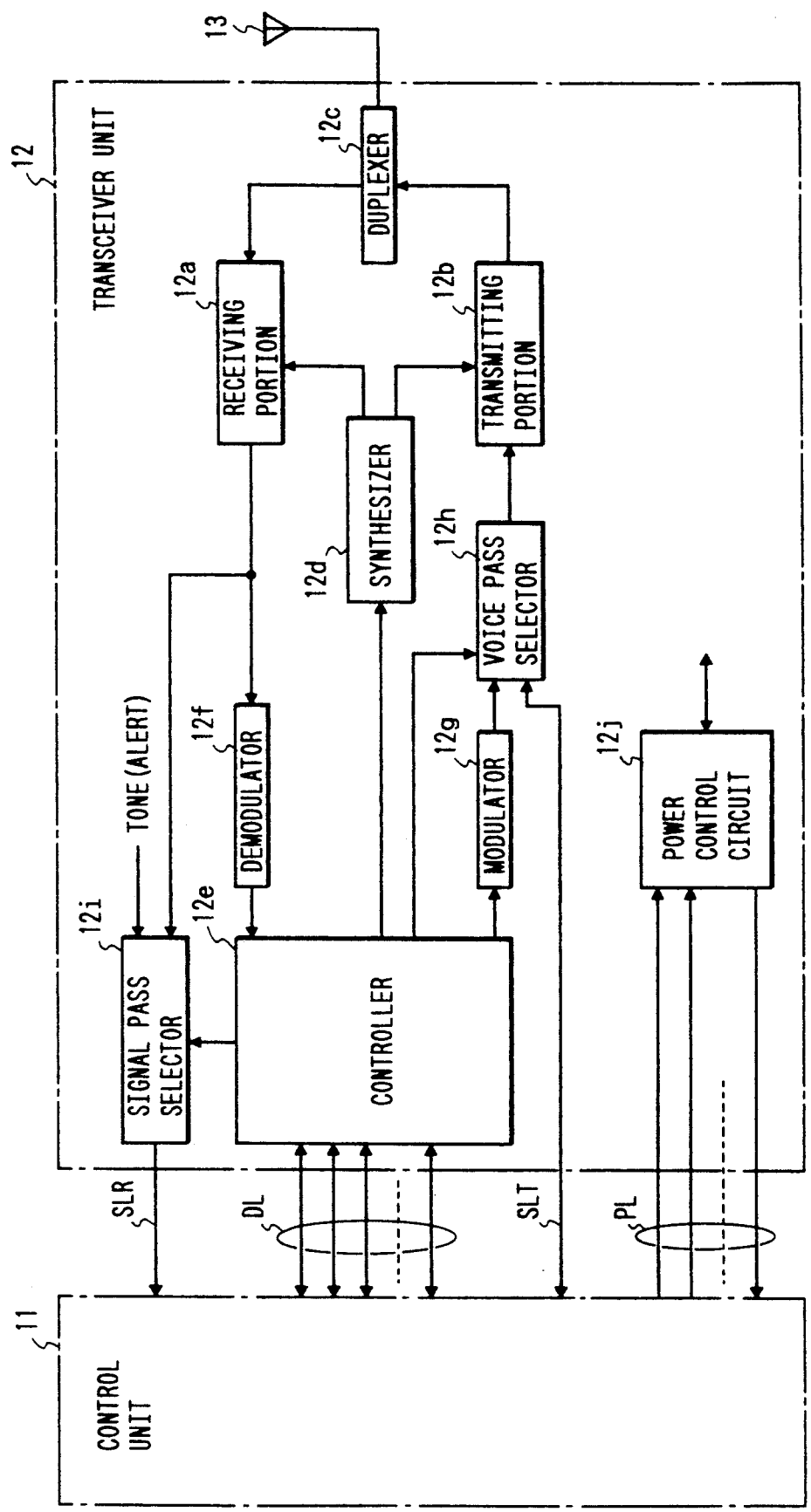

A TEL NO. key (K61) out of the memory call key K6 is depressed when a telephone number is registered in association with the storage areas (abbreviated numbers) of two digits in the first memory. In addition, the TEL NO. key (K61) is also depressed when a telephone call is made by any one of the abbreviated numbers. On the other hand, a NAME key (K62) is depressed when names (character string) are registered and a telephone call by any one of the names is made. (b) Transceiver unit:

As shown in detail in FIG. 1(b), the transceiver unit 12 comprises a receiving portion 12a, a transmitting portion 12b, a duplexer 12c used to automatically switch the antenna from the receiving portion 12a to the transmitting portion 12b at the proper time, a synthesizer 12d for generating a signal of a predetermined frequency in response to a signal from one base station, a controller 12e made up of a microcomputer, for carrying out the control of a received call and a caller's telephone call or the like, a demodulator 12f for demodulating digital data, a modulator 12g for modulating digital data, a voice pass selector 12h for selecting either one of the digital data and the voice delivered from the control unit 11 so as to output the same therefrom, a signal pass selector 12i for selecting either one of a signal from the receiving portion 12a and a tone (alert) generated by an unillustrated tone generator so as to output the same therefrom, and a power control circuit 12j.

(c) General operation

Figure 5:
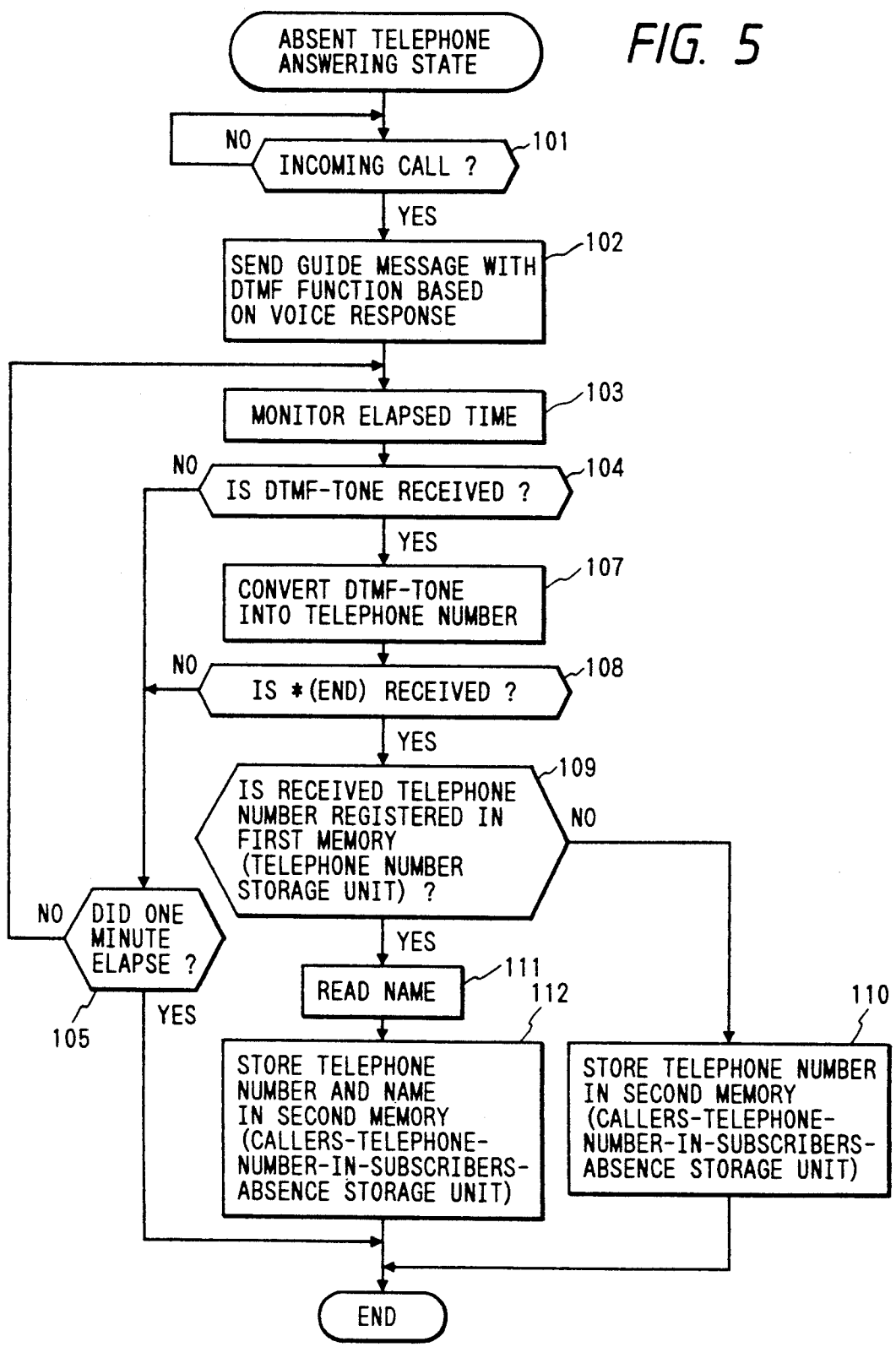
FIG. 5 is a flowchart for describing a routine procedure of storing callers' telephone numbers transmitted by callers during an automatic telephone answering state in a memory.

A description will hereinafter be made of a routine procedure for executing a method or process of storing a callers telephone number transmitted by a caller during an automatic telephone answering state in a memory, according to the present invention, with reference to a flowchart shown in FIG. 5.

When a vehicle's owner leaves his vehicle, the F key (K31) and a O key (K46) are simultaneously depressed so as to set his vehicle telephone set to an automatic telephone answering state. Under this condition, the CPU 11a-1 of the control unit 11 always monitors whether or not an incoming call is received (in Step 101).

If it is determined to be positive in Step 101, the time of the incoming call is stored as data, and the speech synthesizer 11h is activated to send a guide message with a DTMF function to a person who made the telephone call (in Step 102). After the guide message has been transmitted, the DTMF tone/code conversion unit 11i starts to count up the elapsed time (in Step 103).

Then, the DTMF tone/code conversion unit 11i monitors whether or not a DTMF tone is received (in Step 104). Incidentally, if a caller or calling party inputs his telephone number by a key operation in response to the guide message with the DTMF function, then the DTMF tone is transmitted by a calling party.

If it is determined in Step 104 that the DTMF tone is not received, the DTMF tone/code conversion unit 11i checks whether or not one minute elapses (in Step 105). If it is determined to be negative in Step 105, the DTMF tone/code conversion unit 11i is placed in a waiting state until the DTMF tone is received. If one minute elapses without receiving the DTMF tone, a telephone call or message is automatically terminated without storing the caller's telephone number in the second memory 11a-3, thereby completing the routine procedure.

On the other hand, if it is determined to be positive in Step 104, then the DTMF tone/code conversion unit 11i converts a received DTMF tone into a code (telephone number or the like) so as to store the same therein as data (in Step 107).

The DTMF tone/code conversion unit 11i then checks or determines whether or not an end (*) code indicative of completion of the telephone call or message is received from the calling party (in Step 108). If it is determined to be negative in Step 108, the routine procedure subsequent to Step 105 is carried out.

If it is determined to be positive in Step 108, the telephone call or message is terminated. In addition, it is checked (in Step 109) whether or not a telephone number corresponding to the received caller's telephone number is registered in the first memory (telephone number storage unit) 11a-2. If it is determined to be negative in Step 109, the telephone numbers, the time of each of incoming calls, and the number of the incoming calls, all of which have already been received, are stored as data in the second memory (callers-telephone-number-in-subscriber's-absence storage unit) 11a-3 (in Step 110). The manner of storing these data in storage areas is carried out in the following manner. More specifically, the contents of an ith storage area in the second memory 11a-3 are shifted to an (i+1)th storage area, and the telephone number and the like referred to above are written into a first storage or memory area. Thus, the latest twenty telephone numbers are stored as data in the second memory 11a-3. The stored contents shown in FIG. 4 represent one example in which callers' telephone numbers received during an automatic telephone answering state are stored as data. The time of each incoming call becomes older in order of from the first storage area to the twentieth storage area. If the telephone number transmitted by the calling party coincides with one of the telephone numbers which are already stored in the second memory 11a-3, then the number of the incoming calls is incremented by 1 and then stored as data in the first storage area, thereby eliminating the old telephone numbers.

On the other hand, if a telephone number corresponding to the received callers's telephone number has already been registered in the first memory (telephone number storage unit ) 11a-2, then the name stored therein as data in association with such a telephone number is read from the first memory 11a-2 (in Step 111). Then, the name, the time of each of the incoming calls, and the number of the incoming calls are stored as data together with the telephone number referred to above in the second memory (callers-telephone-number-in-subscriber's-absence storage unit) 11a-3 (in Step 112).

The above-described routine process is repeated hereafter each time the incoming call is received.

Incidentally, the calling parties who make phone calls are mostly known to the called party or receiver. Therefore, the name of each of the calling parties can be specified in many cases by registering telephone numbers of these calling parties and their names into the first memory (telephone number storage unit) 11a-2, and the names can be stored as data together with the telephone numbers referred to above in the second memory 11a-3.

Figure 6:
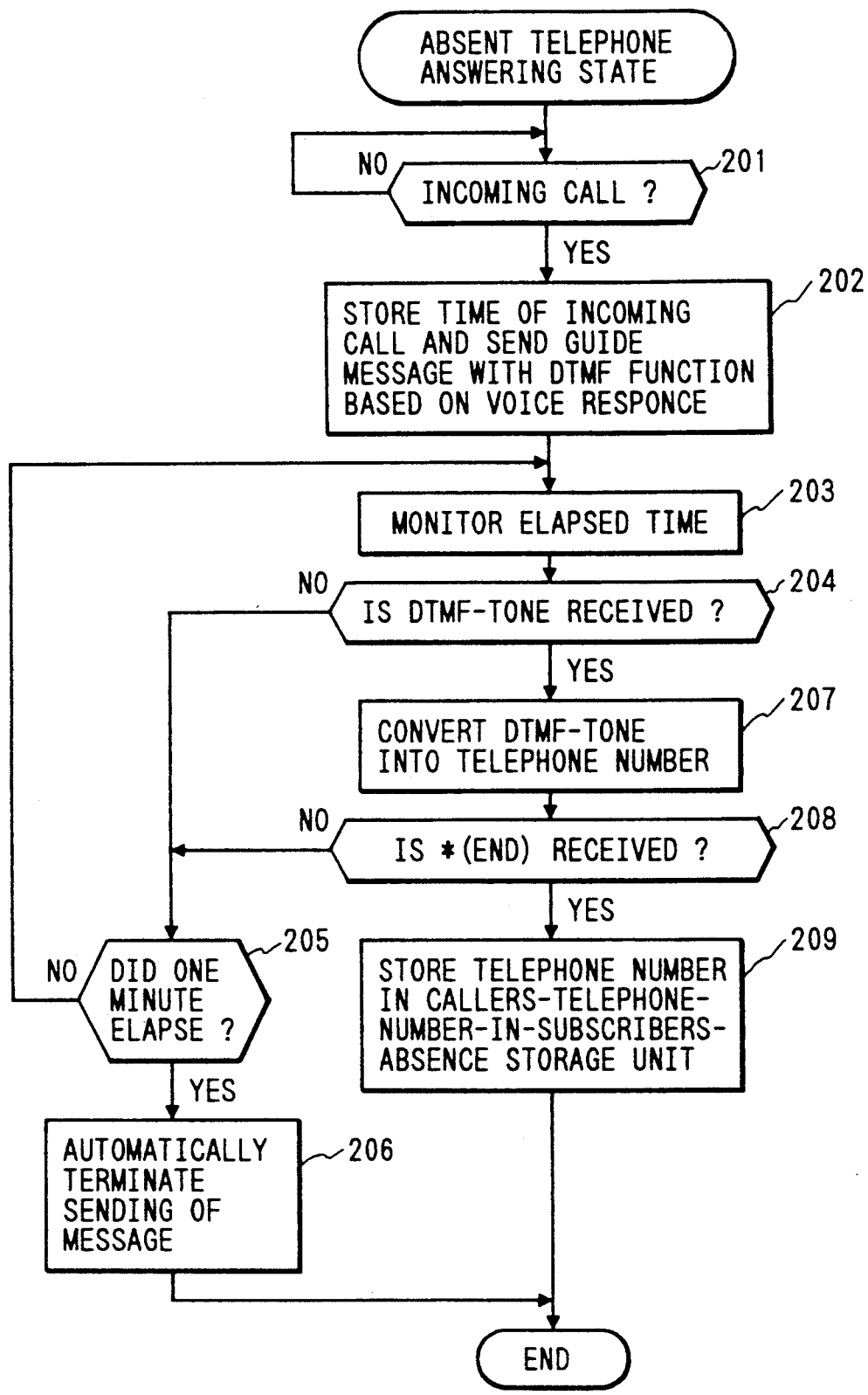
FIG. 6 is a flowchart for describing a routine procedure of storing callers' telephone numbers sent from callers during an automatic telephone answering state in a memory.
Figure 7:
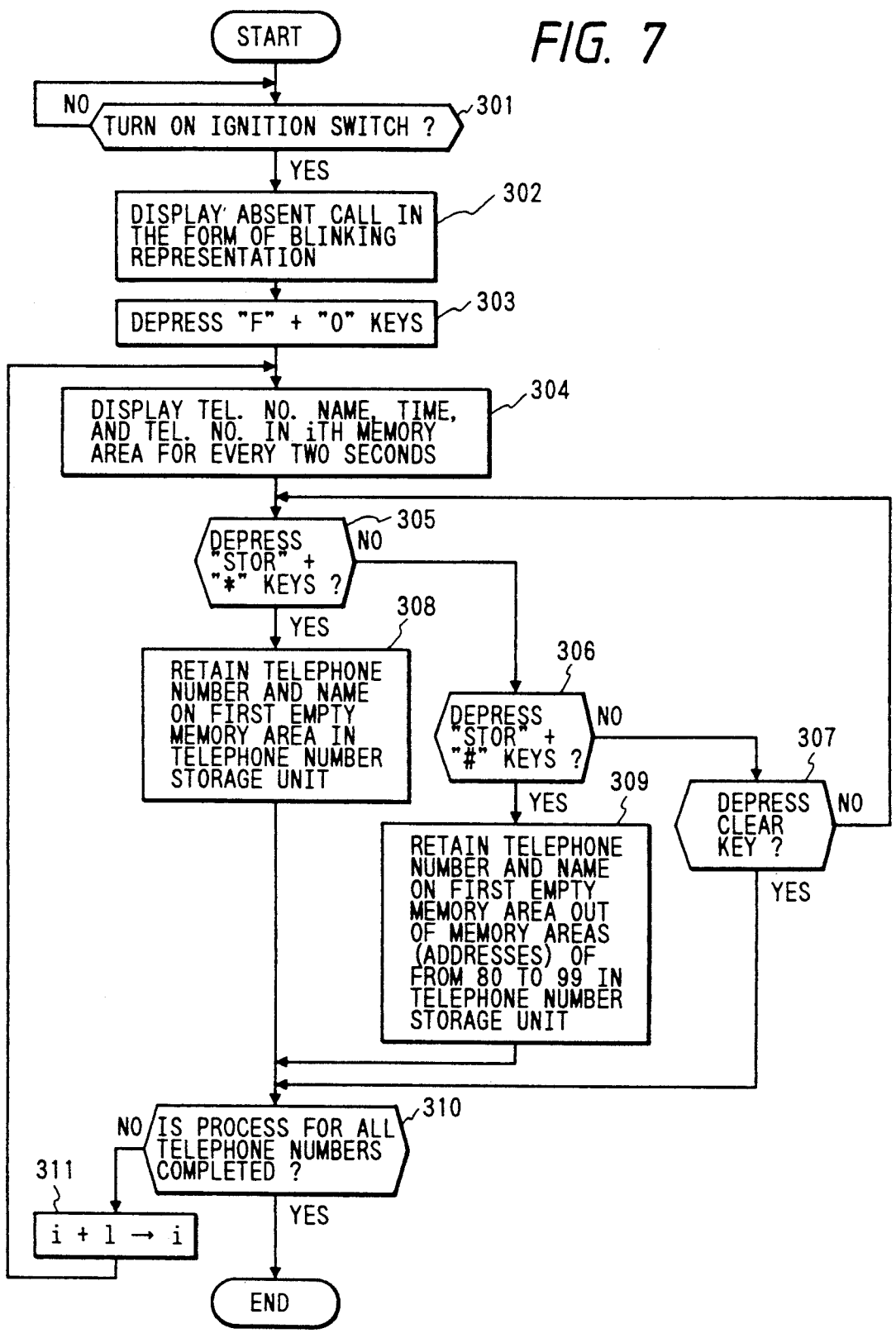
FIG. 7 is a flowchart for describing a routine procedure of retaining callers' telephone numbers on storage areas.

A description will now be made of a process or method of storing callers' telephone numbers transmitted by callers during an automatic telephone answering state in a memory and retaining the same on storage areas in the memory, according to the present invention, with reference to flowcharts shown in FIGS. 6 and 7. Caller's telephone number storing process (see FIG. 6):

When a vehicle's owner leaves his vehicle, the F key (K31) and the O key (K46) are simultaneously depressed so as to set his mobile telephone set to an automatic telephone answering state. Under this condition, the CPU 11a-1 of the control unit 11 always monitors whether or not an incoming call is received (in Step 201).

If it is determined to be positive in Step 201, the time of the incoming call is stored as data, and the speech synthesizer 11h is activated to send a guide message with a DTMF function to a person who is making the telephone call (in Step 202). After the guide message has been transmitted, the DTMF tone/code conversion unit 11i starts to count up the elapsed time (in Step 203).

Then, the DTMF tone/code conversion unit 11i supervises whether or not a DTMF tone is received (in Step 204). Incidentally, if a caller or a calling party inputs his telephone number by his key operation in response to the guide message with the DTMF function, then the DTMF tone is transmitted by the calling party.

If it is determined to be negative in Step 204, the DTMF tone/code conversion unit 11i checks whether or not one minute elapses (in Step 205). If it is determined to be negative in Step 205, the DTMF tone/code conversion unit 11i is placed in a waiting state until the DTMF tone is received. If one minute elapses without receiving the DTMF tone, then a telephone call or message is automatically terminated without storing the caller's telephone number in the second memory 11a-3 (in Step 206), thereby completing the routine procedure.

On the other hand, if it is determined to be positive in Step 204, then the DTMF tone/code conversion unit 11i converts a received DTMF tone into a code (telephone number or the like) so as to store the same therein as data (in Step 207).

The DTMF tone/code conversion unit 11i checks or determines whether or not an end (*) code indicative of completion of the telephone call or message is received from the calling part (in step 208). If it is determined to be negative in Step 208, the routine procedure subsequent to Step 205 is carried out.

If it is determined to be positive in Step 208, the telephone call or message is terminated. In addition, the received telephone numbers, the callers' names, the time of each of the incoming calls and the number of the incoming calls are stored as data in the second memory 11a-3 (in Step 209). The manner of storing these data therein is carried out in the following manner. More specifically, the contents of an ith storage are in the second memory 11a-3 are shifted to an (i+1) th storage area, and the telephone numbers and the like referred to above are written into the first storage area. Thus, the latest twenty telephone numbers are stored as data in the second memory 11a-3. The stored contents shown in FIG. 4 represent one example in which callers' telephone numbers received during an automatic telephone answering state are stored as data. The time of each incoming call becomes older in order of from the first storage area to the twentieth storage area. If the telephone number transmitted from the calling party coincides with one of the telephone numbers which are already stored as data in the second memory 11a-3, then the number of the incoming calls is incremented by 1 and then stored as data in the first storage area, thereby eliminating the old telephone numbers. Retaining process of telephone numbers in the second memory (see FIG. 7):

A description will now be made of an operation for retaining the caller's telephone numbers or the like stored as data in the second memory (callers-telephone-number-in-subscriber's-absence storage unit) 11a-3 onto the first memory (telephone number storage unit) 11a-2.

When the owner rides again in his vehicle and turns on a vehicle ignition switch in an automatic telephone answering state, the CPU 11a-1 is activated to display a character string of "ABSENT CALL" on the display window 11d-1 of the control/display unit lid in the form of blinking representation (in Steps 301 and 302).

When the "F" key (K31) and the "0" key (K46) are simultaneously depressed under this condition (in Step 303), the CPU 11a-1 serves to cyclically display every two seconds the telephone numbers, the names of incoming callers, and the time of each incoming call (including the number of the incoming calls) which are stored as data in the ith storage area (initial value of i is 1) of the second memory 11a-3 on the display window 11d-1 (in Step 304). Incidentally, the order of reading these data from the second memory 11a-3 is carried out based on the principle of the FILO (First In, Last Out), and their reading is carried out in order from the latest data and displayed on the display window 11d-1. The storage area i to be read can be subjected to an up/down process by using a key K5.

In a state in which the contents of the ith storage area have been displayed, the CPU 11a-1 monitors or checks whether the "STOR" key (K32) and "*" key (K47) are depressed simultaneously or the "STOR" key (K32) and "#" key (K48) are depressed simultaneously, or the "CLR" key (K22) is depressed (in Steps 305 to 307).

When the "STOR" key (k32) and "*" key (K47) are depressed simultaneously, the contents (telephone numbers and names) of the ith storage area in the second memory 11a-3 are stored as data in a first empty or space storage area, starting from a leading storage area 00, and the contents of the ith storage area are cleared (in Step 308). When the "STOR" key (K32) and the "#" key (K48) are depressed simultaneously, the contents (telephone numbers and names) of the ith storage area in the second memory 11a-3 are stored as data in a first space storage area, starting from a leading storage area out of a second storage or memory area SMA (including 80th storage area through 99th storage area), and the contents of the ith storage area is cleared (in Step 309). When the "CLR" key (K22) is depressed, the contents of the ith storage area is cleared without retaining the same therein.

A check is made (in Step 310) as to whether or not the above process is completed with respect to all the telephone numbers received in the automatic telephone answering state. If it is determined to be positive in Step 310, the storing process is finished. If it is determined to be negative in Step 310, "1+1" is decremented or counted down by 1 so as to be "i" (in Step 311), and the routine procedure subsequent to Step 304 is repeated.

When a specific symbol or mark is applied to the data indicative of the telephone number and such data is stored in the first memory 11a-2, the discrimination between other telephone numbers and a telephone number called when being in the subscriber's absence is made easy later. When the telephone number data is stored in the second storage or memory area SMA of the first memory, the discrimination between such a telephone number and other telephone numbers can be made easy without applying a specific symbol to the telephone number data provided that the second memory are SMA is defined as a retaining area.

The illustrated embodiment has shown and described where the "STOR" key (K32) and the "*" key (K47) are depressed simultaneously, and where the "STOR" key (K32) and the "#" key (K48) are depressed simultaneously. However, only one of the two cases may be applied.

Having now fully described the invention, it will be apparent to those skilled in the art that many changes and modifications can be made without departing from the spirit or scope of the invention as set forth herein.

What is claimed is:

1. A method for storing incoming call telephone numbers transmitted by callers during an automatic telephone answering state in a telephone system, said method comprising the steps of:

providing a first memory for storing therein telephone numbers and associated names, and a second memory for storing therein incoming telephone numbers transmitted by callers during the automatic telephone answering state;

determining if an incoming call is during the automatic telephone answering state;

generating a message in response to receiving the incoming call during the automatic telephone answering state;

receiving a signal indicative of the incoming call telephone number and converting the signal into the incoming call telephone number;

determining if the incoming call telephone number coincides with one of the telephone numbers stored in the first memory;

reading the associated name from the first memory in response to the incoming call telephone number coinciding with one of the telephone numbers stored in the first memory;

storing in time sequential order in the second memory a plurality of incoming call telephone numbers from the telephone numbers transmitted by the callers during the automatic telephone answering state and also storing the associated names read from the first memory;

sequentially displaying the incoming call telephone numbers received during the automatic telephone answering state and stored in the second memory; and transferring a displayed telephone number to an empty storage area in the first memory.

2. A method as in claim 1, wherein the transferring step is carried out when one or more keys of the telephone system are depressed.

3. A method as in claim 2, wherein the displayed telephone number is transferred to an empty storage area of a first memory area in the first memory when one or more of the keys grouped in a first combination are depressed.

4. A method as in claim 2, wherein the displayed telephone number is transferred to an empty storage area of a second memory area in the first memory when another or more of the keys grouped in a second combination are depressed.

5. A method for storing incoming call telephone numbers transmitted by callers during an automatic telephone answering state in a telephone system, said method comprising the steps of:

providing a first memory for storing therein telephone numbers and associated names, and a second memory for storing therein incoming telephone numbers transmitted by callers during the automatic telephone answering state;

determining if an incoming call is during the automatic telephone answering state;

generating a guide message in response to receiving the incoming call during the automatic telephone answering state;

receiving a signal indicative of the incoming call telephone number and converting the signal into the incoming call telephone number;

determining if the incoming call telephone number coincides with one of the telephone numbers stored in the first memory;

reading the associated name from the first memory in response to the incoming call telephone number coinciding with one of the telephone numbers stored in the first memory;

storing in time sequential order in the second memory a plurality of incoming call telephone numbers from the telephone numbers transmitted by the callers during the automatic telephone answering state and also storing the associated names read from the first memory; and eliminating a telephone number previously stored in the second memory and incrementing the number of an incoming call by one in response to the incoming call telephone number coinciding with one of the telephone numbers previously stored in the second memory.

6. A telephone system comprising:

a first memory for storing telephone numbers and associated names therein;

means for setting the telephone to an automatic telephone answering state;

a synthesizer for generating a guide message to a caller in response to receiving an incoming call during the automatic telephone answering state;

means for receiving and converting a signal transmitted by the caller and indicative of the incoming call telephone number into the incoming call telephone number;

means for reading the associated name from the first memory in response to the incoming call telephone number coinciding with one of the telephone numbers stored in the first memory;

a second memory for storing therein in time sequential order a plurality of incoming call telephone numbers from telephone numbers transmitted by callers during the automatic telephone answering state and the associated names read from the first memory;

means for sequentially displaying the incoming call telephone numbers received during the automatic telephone answering state and stored in the second memory; and means for transferring a displayed telephone number to an empty storage area in the first memory.

7. A vehicle telephone system as in claim 6, wherein the transferring means is activated to transfer the displayed telephone number when one or more keys of the telephone system are depressed.

8. A vehicle telephone system as in claim 7, wherein the transferring means is activated to transfer the displayed telephone number to an empty storage area of a first memory area in the first memory when one or more of the keys grouped in a first combination are depressed.

9. A vehicle telephone system as in claim 7, wherein the transferring means is activated to transfer the displayed telephone number to an empty storage area of a second memory area in the first memory when one or more of the keys grouped in a second combination are depressed.

10. A telephone system comprising:

a first memory for storing telephone numbers and associated names therein;

means for setting the telephone to an automatic telephone answering state;

a synthesizer for generating a message to a caller in response to receiving an incoming call during the automatic telephone answering state;

means for receiving and converting a signal transmitted by the caller and indicative of the incoming call telephone number into the incoming call telephone number;

means for reading the associated name from the first memory in response to the incoming call telephone number coinciding with one of the telephone numbers stored in the first memory;

a second memory for storing therein in time sequential order a plurality of incoming call telephone numbers from telephone numbers transmitted by callers during the automatic telephone answering state and the associated names read from the first memory; and means for eliminating a telephone number previously stored in the second memory and incrementing the number of an incoming call by one in response to the incoming call telephone number coinciding with one the telephone numbers previously stored in the second memory.

* * * * *